(12) United States Patent
Ekambaram et al.

(10) Patent No.: US 10,929,899 B2
(45) Date of Patent: Feb. 23, 2021

(54) DYNAMIC PRICING OF APPLICATION PROGRAMMING INTERFACE SERVICES

(71) Applicant: International Business Machines Corporation, Armonk, NY (US)

(72) Inventors: Vijay Ekambaram, Bangalore (IN); Nitin Gupta, New Delhi (IN); Pankaj S. Dayama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 15/844,945

(22) Filed: Dec. 18, 2017

(65) Prior Publication Data

US 2019/0188760 A1 Jun. 20, 2019

(51) Int. Cl.
 *G06Q 30/02* (2012.01)
 *G06F 9/54* (2006.01)
 *G06K 9/62* (2006.01)
 *G06N 20/00* (2019.01)

(52) U.S. Cl.
 CPC ......... *G06Q 30/0283* (2013.01); *G06F 9/547* (2013.01); *G06K 9/6282* (2013.01); *G06N 20/00* (2019.01)

(58) Field of Classification Search
 CPC .............................. G06Q 30/0283; G06F 9/547
 USPC ......................................................... 705/400
 See application file for complete search history.

(56) References Cited

U.S. PATENT DOCUMENTS

| 6,703,934 | B1 | 3/2004 | Nijman et al. |
| 7,330,839 | B2 | 2/2008 | Srinivasan et al. |
| 7,743,001 | B1 | 6/2010 | Vermeulen et al. |
| 8,005,697 | B1 | 8/2011 | Cohen et al. |
| 8,645,199 | B1* | 2/2014 | Sarkar ................ G06Q 30/0273 705/14.1 |
| 2007/0294337 | A1* | 12/2007 | Gaos ....................... H04L 67/14 709/203 |
| 2008/0154798 | A1 | 6/2008 | Valz |

(Continued)

OTHER PUBLICATIONS

Chen et. al., "Model-based Pricing: Do Not Pay for More than What You Learn!", DEEM'17, May 2017, Chicago, Illinois, USA, pp. 1-4 (Year: 2017).*

Internet Archive Capture of Aug. 24, 2017 indicating that "Model-based Pricing: Do Not Pay for More than What You Learn!" was online and avaiable to the public in PDF form on the Author's Web page (Year: 2017).*

(Continued)

*Primary Examiner* — Kevin H Flynn
*Assistant Examiner* — Emmett K. Walsh
(74) *Attorney, Agent, or Firm* — Ryan, Mason & Lewis, LLP

(57) ABSTRACT

Systems and methods are provided for dynamic pricing of application programming interface (API) services such as machine learning API services. For example, a computing platform of an API service provider is configured to receive a request for a machine learning API service from a client computing device, obtain a dataset from the client computing device, utilize a classification engine to classify one or more attributes of the dataset and to classify an expected level of performance of the machine learning API service applied to the dataset based on the one or more classified attributes of the dataset, dynamically determine a pricing for the machine learning API service based on the classified expected level of performance of the dataset, and present the determined pricing for the machine learning API service on the client computing device.

14 Claims, 11 Drawing Sheets

(56) References Cited

U.S. PATENT DOCUMENTS

| | | | | |
|---|---|---|---|---|
| 2014/0140625 A1* | 5/2014 | Zhang | ............... | G06K 9/00677 |
| | | | | 382/195 |
| 2014/0278454 A1 | 9/2014 | Peled | | |
| 2015/0317659 A1 | 11/2015 | Nayak et al. | | |
| 2016/0092897 A1* | 3/2016 | Natarajan | .......... | G06Q 30/0206 |
| | | | | 705/7.35 |
| 2016/0110657 A1* | 4/2016 | Gibiansky | .............. | G06N 20/00 |
| | | | | 706/12 |
| 2016/0225042 A1 | 8/2016 | Tran et al. | | |
| 2016/0292018 A1 | 10/2016 | Laredo et al. | | |
| 2017/0039045 A1 | 2/2017 | Abrahami et al. | | |
| 2017/0344859 A1* | 11/2017 | Mo | ........................ | G06K 9/627 |
| 2018/0157899 A1* | 6/2018 | Xu | ....................... | G06K 9/4628 |
| 2019/0086988 A1* | 3/2019 | He | .......................... | G06N 20/00 |
| 2019/0147361 A1* | 5/2019 | Matsumoto | ............ | G06N 99/00 |
| | | | | 706/12 |

OTHER PUBLICATIONS

"Oversampling and undersampling in data analysis"( Wikipedia page access via webarchive for Jul. 21, 2017; made of record in PTO-892 and attached hereto; hereinafter "Oversampling") (Year: 2017).*

Microsoft Azure: "Windows Virtual Machines Pricing"; accessed on Oct. 5, 2020 via WebArchive (Snapshot of Oct. 5, 2017) available at: https://azure.microsoft.com/en-us/pricing/details/virtual-machines/windows/ (Year: 2017).*

K. De et al., "Image Sharpness Measure for Blurred Images in Frequency Domain," Procedia Engineering, International Conference on Design and Manufacturing (IConDM), 2013, pp. 149-158, vol. 64.

* cited by examiner

DYNAMIC PRICING OF APPLICATION PROGRAMMING INTERFACE SERVICES

TECHNICAL FIELD

This disclosure relates generally to the field of computer programming, and more particularly, systems and methods for pricing an application programming interface (API) service.

BACKGROUND

An API is a particular set of rules and specifications that a software program can utilize to access and make use of the services and resources provided by another particular software program which implements the API. The API specifies how software components interact with each other, and often comes in the form of a library that includes specifications for routines, data structures, object classes, and variables. An API specifies a set of functions and routines which accomplish a task or which interact with a specific software component. An API serves as an interface between different software programs and facilitates interaction between the software programs.

Many applications utilize machine learning for various purposes such as image and video analysis, optical character recognition, speech recognition and transcription, natural language processing, etc. Instead of building and maintaining machine learning models for such applications, software developers and cloud service providers can purchase machine learning API services from third-parties, wherein machine learning models are abstracted as APIs to provide access to pre-trained machine learning models for target applications. Such API services enable access to pre-trained machine learning models using API calls. This allows program developers and cloud service providers to readily integrate machine learning functionalities into their applications without the need for expert knowledge or time for building their own machine learning models. While an API service provider can provide access to a machine learning API service at a fixed cost, the pricing of the machine learning API service, however, can be difficult because the performance of the machine learning API service can vary significantly for different customers depending on the data quality and characteristics of the datasets which the customers apply to the machine learning API service.

SUMMARY

Embodiments of the invention generally include systems and methods for dynamically pricing API services such as machine learning API services. In one embodiment, a method comprises: receiving a request for a machine learning API service from a client computing device; obtaining a dataset from the client computing device; utilizing a classification engine to classify one or more attributes of the dataset and to classify an expected level of performance of the machine learning API service applied to the dataset based on the one or more classified attributes of the dataset; dynamically determining a pricing for the machine learning API service based on the classified expected level of performance of the dataset; and presenting the determined pricing for the machine learning API service on the client computing device.

In another embodiment, a method comprises: receiving by a server, a request for a machine learning application programming interface (API) service from a client computing device; accessing by the server, a sampled dataset on the client computing device; downloading by the server, a classification engine to the client computing device and utilizing the classification engine to classify one or more attributes of the sampled dataset on the client computing device and to classify an expected level of performance of the machine learning API service applied to the sampled dataset based on the one or more classified attributes of the sampled dataset; receiving by the server, classification results returned from the client computing device, wherein the classification results comprise the classified expected level of performance of the sampled dataset; dynamically determining by the sever, a pricing for the machine learning API service based on the returned classification results; and presenting by the server, the determined pricing for the machine learning API service on the client computing device.

Other embodiments will be described in the following detailed description of embodiments, which is to be read in conjunction with the accompanying figures.

DETAILED DESCRIPTION OF EMBODIMENTS

Figure 1:
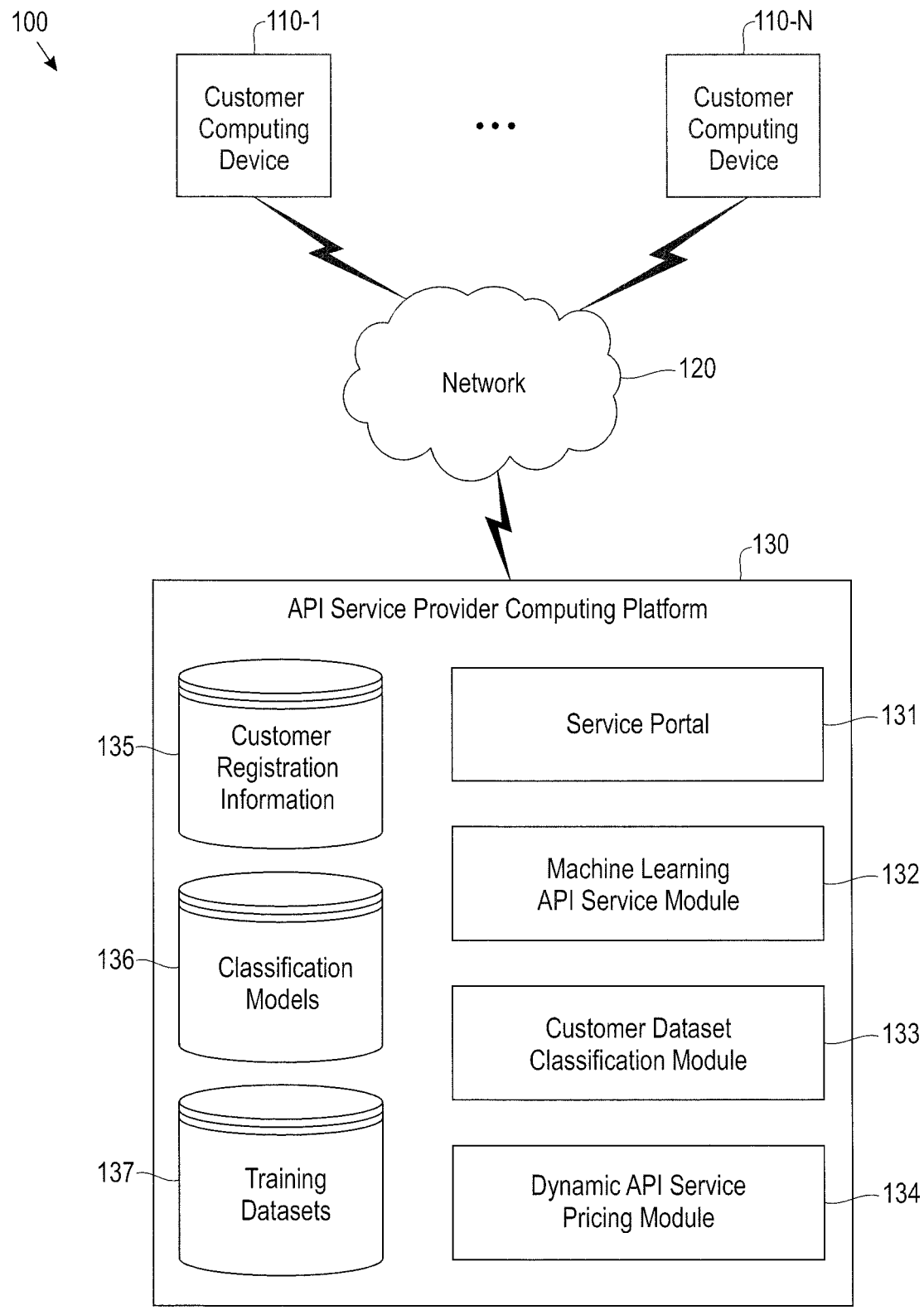
FIG. 1 schematically illustrates a system which comprises a computing platform that is configured to provide dynamic pricing of API services, according to an embodiment of the invention.

Embodiments will now be discussed in further detail with regard to systems and methods for dynamically pricing API services such as machine learning API services. For example, FIG. 1 schematically illustrates a system 100 which comprises a computing platform that is configured to provide dynamic pricing of API services, according to an embodiment of the invention. The system 100 comprises a plurality of customer computing devices 110-1, ..., 110-N (collectively, customer computing devices 110), a communications network 120, and an API service provider computing platform 130. The computing platform 130 comprises various system modules that are collectively configured to enable customer access to API services provided by the computing platform 130, wherein the system modules include, for example, a front-end service portal 131, a machine learning API service module 132, a dataset classification module 133, and a dynamic API service pricing module 134, the functionalities of which will be explained in further detail below. The computing platform 130 further comprises a plurality of databases (or data stores) including, but not limited to, a database of registered customer information 135, a database of classification models 136, and a database of training datasets 137.

The communications network 120 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The customer computing devices 110 include various types of computing devices such as desktop computers, smart phones, electronic tablets, laptop computers, etc., which are utilized by customers to access one or more API services provided by the computing platform 130.

While the computing platform 130 is generically illustrated in FIG. 1 for illustrative purposes, it is to be understood that the various system modules 131, 132, 133, and 134 of the computing platform 130 may be distributed over a plurality of computing nodes (e.g., a cluster of servers, virtual machines, etc.) that collectively operate to implement the functions described herein. In addition, the various databases 135, 136 and 137 may be implemented using any suitable type of database system (e.g., structured query language (SQL), non-SQL, etc.) and/or supported by any suitable data storage system or combination of data storage systems, including, but not limited to storage area network (SAN) systems, direct attached storage (DAS) systems, a serial attached storage (SAS/SATA) system, as well as other types of data storage systems comprising clustered or distributed virtual and/or physical infrastructure.

In this regard, the API service provider computing platform 130 may be implemented in a data center or be a cloud computing platform that performs data computing and data storage functions to provide API services to multiple end users, service providers, and/or organizations. For example, in one embodiment of the invention, the computing platform 130 is configured to provide machine learning API services to customers, wherein the customers comprise third-party application developers or cloud service providers, for example, who can purchase and access machine learning API services from the API service provider platform 130 to support machine learning functions. The machine learning models maintained by the API service provider computing platform 130 are abstracted as APIs to provide access to pre-trained machine learning models for target applications. Such API services enable access to pre-trained machine learning models using API calls. This allows program developers and cloud service providers to readily integrate machine learning functionalities into their applications.

The system modules 131, 132, 133, and 134 of the API service provider computing platform 130 implement various methods that are configured to provide machine learning API services to registered customers, as well as provide dynamic pricing of machine learning API services, wherein the pricing of a machine learning API service to a given customer is determined according to an expected level of performance of the API service for a given dataset of a customer. This is in contrast to conventional techniques in which a fixed pricing scheme is implemented for an API service where a customer pays a fixed price (e.g., fixed fee per API call) for utilizing the API service (i.e., pricing is usage-based wherein a fixed cost is applied based on the number of requests made to the API), irrespective of the performance of the API service with regard to the customer's datasets.

The front-end service portal 131 is configured to implement device interfaces that enable the computing devices 110 to connect and communicate with the computing platform 130, as well as graphical user interfaces that enable customers to register with, and access API services provided by, the API service provider computing platform 130. As part of a user registration process, the front-end service portal 131 will collect relevant customer information and store such information in the database 135 of registered customer information, wherein each registered customer is associated with a unique customer identifier (ID). The information of a registered customer will include information regarding a current pricing scheme that is applicable to the registered customer.

The machine learning API service module 132 comprises a machine learning classification system that is configured to process requests from registered customers for machine learning API services. For example, in one embodiment of the invention, the machine learning API service module 132 is configured to provide a fashion API service to classify fashion image data provided by a customer. In particular, for fashion API services, the machine learning API service module 132 utilizes a machine learning classification engine (e.g., deep convolutional neural network) that is configured to access and utilize pre-trained models from the database of classification models 136 to process images and recognize and classify different types of articles of clothing (different article classes) within the images, including, but not limited to, shirts, pants, boots, shoes, sandals, hats, suits, shoes, sneakers, jewelry, sunglasses, jeans, sweaters, skirts, leggings, button down shirts, pull over shirts, heels, pumps, wedges, lingerie, blouses, jackets, watches, bathing suits, shorts, blazers, and other type of articles of clothing or wearing apparels. In addition, the machine learning API service module 132 is configured to process fashion image data using pre-trained classification models to recognize and classify different dress styles or fashion styles, e.g., personal dress styles, casual dress styles, formal dress styles, professional dress styles, sports dress styles, etc.

The customer dataset classification module 133 comprises methods that are configured to process a dataset of a given customer (e.g., fashion image dataset) and classify the dataset based on attributes/characteristics of the dataset, which could affect the level of performance (e.g., classification results) that a given customer would realize when utilizing the machine learning API services of the computing platform 130 to process the dataset of the customer. For example, for datasets that include a collection of images to be analyzed, various characteristics of the images such as illumination level, blurriness level, image clutter, etc., can affect the ability of a classification system to analyze the image data and detect target features in the images. As explained in further detail below, the customer dataset classification module 133 builds and utilizes classification models (e.g., decision tree classification models) to classify one or more attributes of a dataset and to classify an expected level of performance of the machine learning API service applied to the dataset based on the one or more classified attributes of the dataset. The dynamic API service pricing module 134 implements methods to dynamically determine pricing for API services to customers based on the attribute/performance classification results of the customer datasets as determined by the customer dataset classification module 133.

Figure 2:
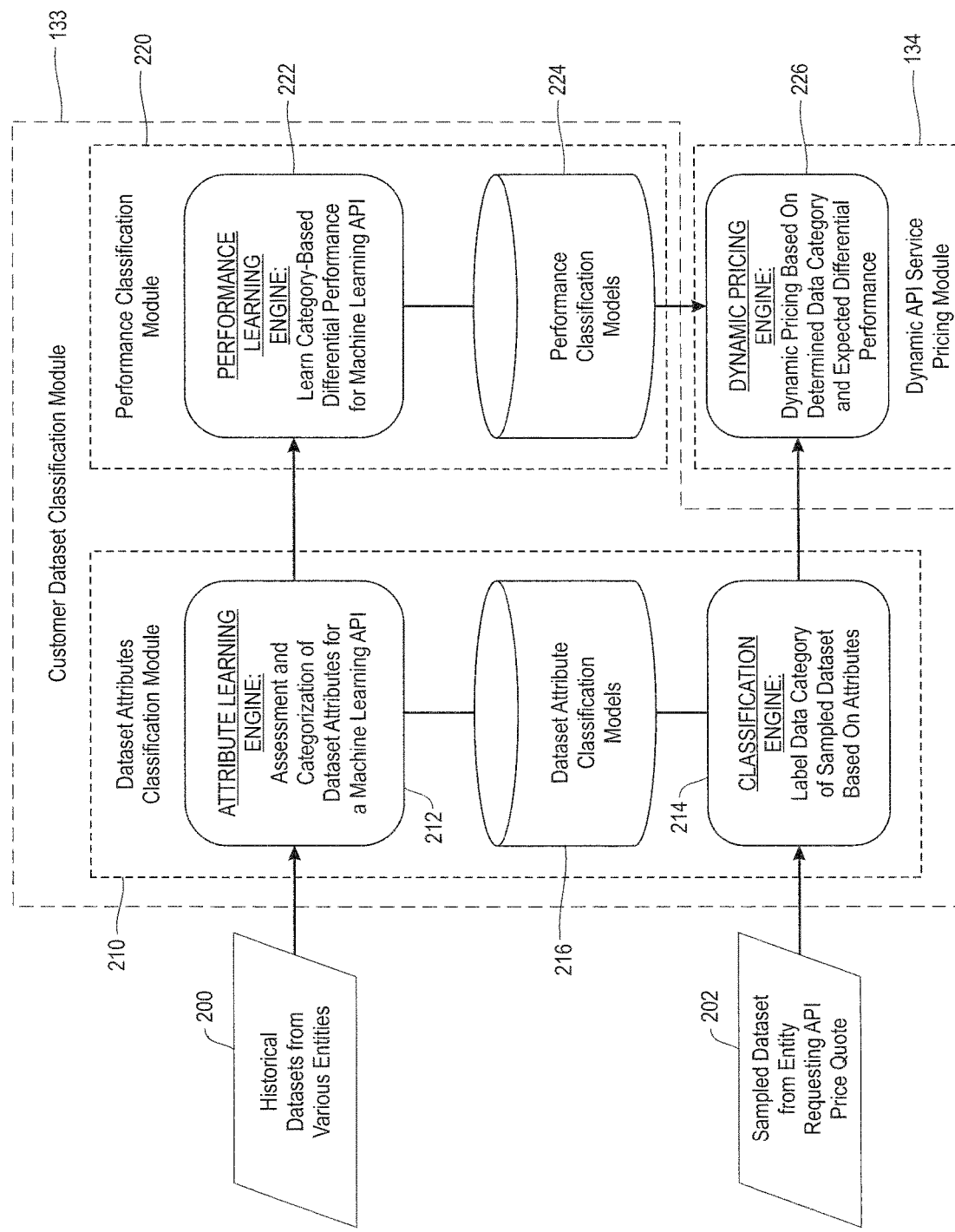
FIG. 2 is a block diagram that illustrates details of processing modules and operational modes of the computing system of FIG. 1, according to an embodiment of the invention.

FIG. 2 is a block diagram that illustrates details of processing modules and operational modes of the computing system of FIG. 1, according to an embodiment of the invention. In particular, FIG. 2 illustrates systems and methods that are implemented by the customer dataset classification module 133 and the dynamic API service pricing module 134, according to embodiments of the invention. As illustrated in FIG. 2, the customer dataset classification module 133 obtains and processes various datasets including historical datasets from various entities 200 and a sampled dataset 202 from an entity requesting a price quote for an API service. In one example embodiment as shown in FIG. 2, the customer dataset classification module 133 comprises a dataset attributes classification module 210, and a performance classification module 220. The dataset attributes classification module 210 comprises an attribute learning engine 212, a classification engine 214, and dataset attribute classification models 216. The performance classification module 220 comprises a performance learning engine 222 and performance classification models 224. The dynamic API service pricing module 134 comprises a dynamic pricing engine 226.

The historical datasets 200 comprises datasets that are collected from various customers over time. The historical datasets 200 are utilized as training data to learn different attributes and to build classification models that are utilized by the dataset attributes classification module 210 and the performance classification module 220 to perform respective functions. The historical datasets 200 comprise training data that are stored in the database of training datasets 137 (FIG. 1). The sampled dataset 202 comprises test data from a given entity requesting a price quote for an API service. The sampled dataset 202 comprises a sampled subset of an overall dataset of the customer, which is obtained from the customer and processed to determine how the machine learning API service is expected to perform with the customer's dataset and to determine a price quote for the API service based on the expected level of performance.

The attribute learning engine 212 is configured to process the historical datasets 200 and learn different dataset attributes such as illumination, blur, clutter, etc. which can affect the performance of a given machine learning API service. The attribute learning engine 212 utilizes the learned dataset attributes to build the dataset attribute classification models 216 (e.g., decision tree classifiers). In particular, in one embodiment, the dataset attribute classification models 216 comprise decision tree classification models that are configured to map extracted features from the historical datasets 200 to different attributes such as, e.g., illumination, blurriness, quality, clutterness, a combination of attributes, etc. In addition, the dataset attribute classification models 216 comprise decision tree classification models that are configured to classify datasets by labeling the datasets with data categories based on a set of one or more dataset attributes associated with the datasets. As more training data (e.g., historical datasets) are collected over time, the attribute learning engine 212 utilizes the dataset attribute classification models 216 to assess and categorize the new training datasets. When data samples in the historical datasets 200 cannot be properly classified, the attribute learning engine 212 utilizes such samples to learn new dataset attributes and update the dataset attribute classification models 216 accordingly.

The performance learning engine 222 is configured to process the data-categorized historical datasets 200 along with information regarding actual performance obtained by background processing of the historical datasets using the machine learning API models, to learn "expected differential performance" data which comprise information regarding the performance of the machine learning models based on different categories. The performance learning engine 222 utilizes the expected differential performance data to build the performance classification models 224. In one embodiment, the performance classification models 224 comprise decision tree classification models that map different data categories to excepted performance classes. For example, if a given dataset is determined to have an amount B1 of blurriness on average (e.g., blurriness data distribution over dataset), it can be learned that the expected level of performance of the machine learning API service will be within a first range of performance levels for the given dataset. Similarly, if a given dataset is determined to have an amount B2 of blurriness on average wherein B2 is greater than B1, it can be learned that the expected level of performance of the machine learning API service will be within a second range of performance levels, which is less than the first range of expected performance levels for the given dataset.

The classification engine 214 comprises methods that are configured to extract features from the input sampled dataset 202, which are indicative of target dataset attributes that are used to assess an expected level of performance, and utilize the dataset attributes classification models 216 to label one or more data categories of the sampled dataset 202 based on the determined attributes of the sampled dataset 202. The labeled dataset is then input to the dynamic API service pricing module 134. The dynamic pricing engine 226 is configured to process the labeled dataset and determine a pricing for a machine learning API service based on the determined data category or data categories of the labeled dataset and the expected level of performance of the dataset based on the determined categories.

Figure 3:
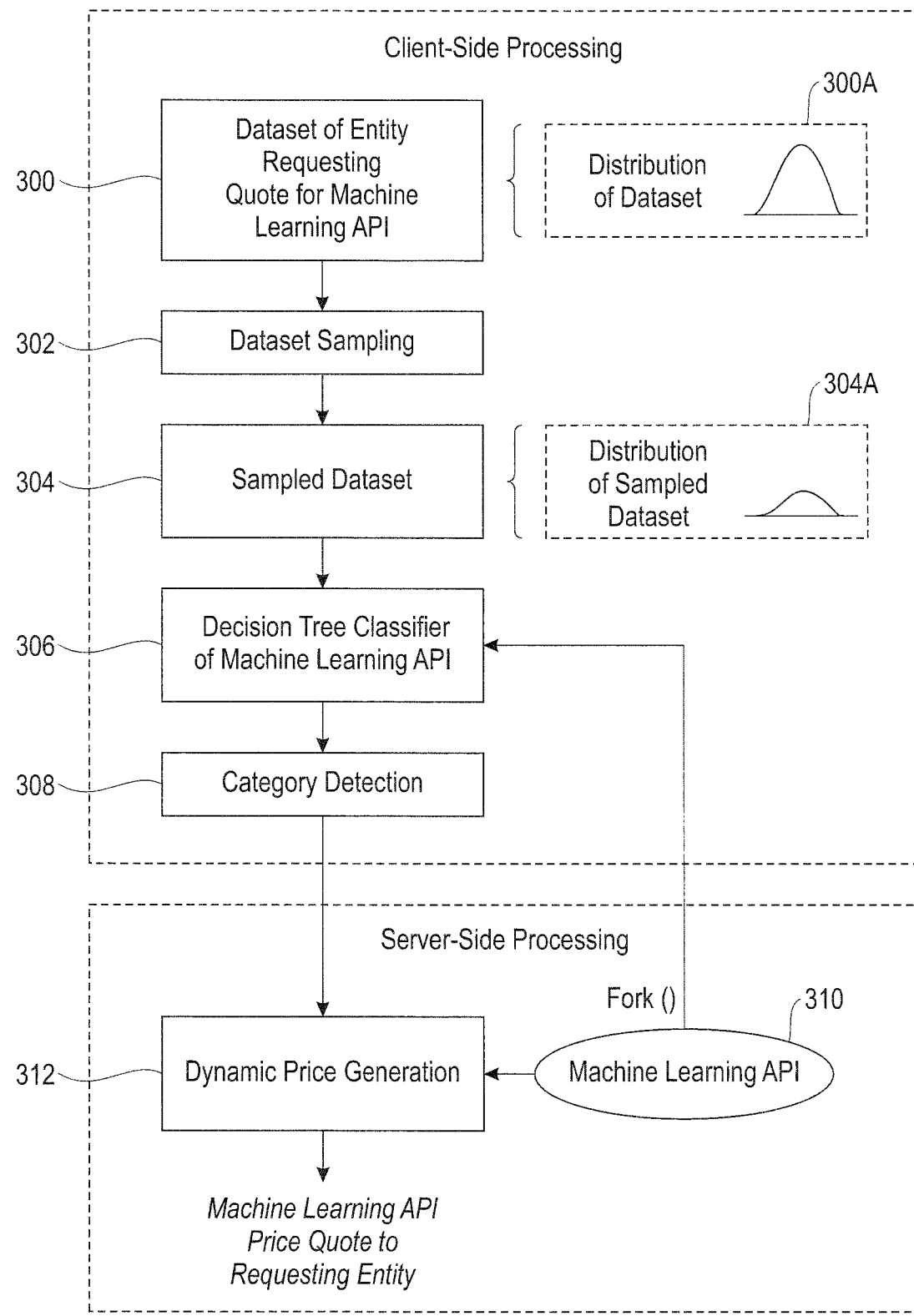
FIG. 3 schematically illustrates a method for dynamic pricing of a machine learning API service, according to an embodiment of the invention.

FIG. 3 schematically illustrates a method for dynamic pricing of a machine learning API service, according to an embodiment of the invention. In particular, in one embodiment, FIG. 3 illustrates functions that are implemented using client-side processing and server-side processing to implement the functionalities of the customer dataset classification module 133 and the dynamic API service pricing module 134 of FIG. 1, according to an embodiment of the invention. When a customer wants to purchase a machine learning API service from the computing platform 130, the customer will obtain a desired dataset (block 300) which is to be processed using the machine learning API service, sample the dataset (block 302) to obtain a sampled dataset 304, which comprises a subset of the original dataset. Assuming the original dataset has a given data distribution 300A, the sampled dataset should have a similar data distribution 304A so that an accurate classification can be obtained using the sampled data set, which would also be indicative of the original dataset.

The machine learning API service will execute a fork function Fork ( ) (block 310) to duplicate a decision tree classifier (block 306) on the customer computing device which performs client-side processing of the sampled dataset 304 to detect one or more data categories (block 308) of the sampled dataset 304. In one embodiment, the decision tree classifier (block 306) is a lightweight version of the classification engine 214 of FIG. 2, which utilizes the learned dataset attribute classification models 216 to classify one or more data categories of the sampled dataset. The classification results (block 308) are then transmitted to the computing platform 130 for server-side processing by the dynamic API service pricing module 134 to dynamically generate a price quote (block 312) to the given customer. The price quote is dynamically generated based on an excepted performance of the machine learning API service which is determined based on the data category classification of the sampled dataset. The price quote is then sent to the customer wherein the customer will either accept the price quote, or negotiate with the service provider to come to a mutual price based on, e.g., the initial price quote.

As noted above, the dataset attribute classification models 216 (FIG. 2) are utilized to determine one or more dataset attributes associated with the given dataset and then classify and label the given dataset with one or more data categories based on the associated dataset attributes. In addition, the performance classification models 224 (FIG. 2) are utilized to determine an expected level of performance of a given machine learning API service applied to the given dataset based on the determined attributes of the dataset. In one embodiment of the invention, the attribute classification models 216 and the performance classification models 224 are implemented using decision tree classification techniques, as schematically illustrated by the example embodiments of FIGS. 4, 5 and 6.

Figure 4:
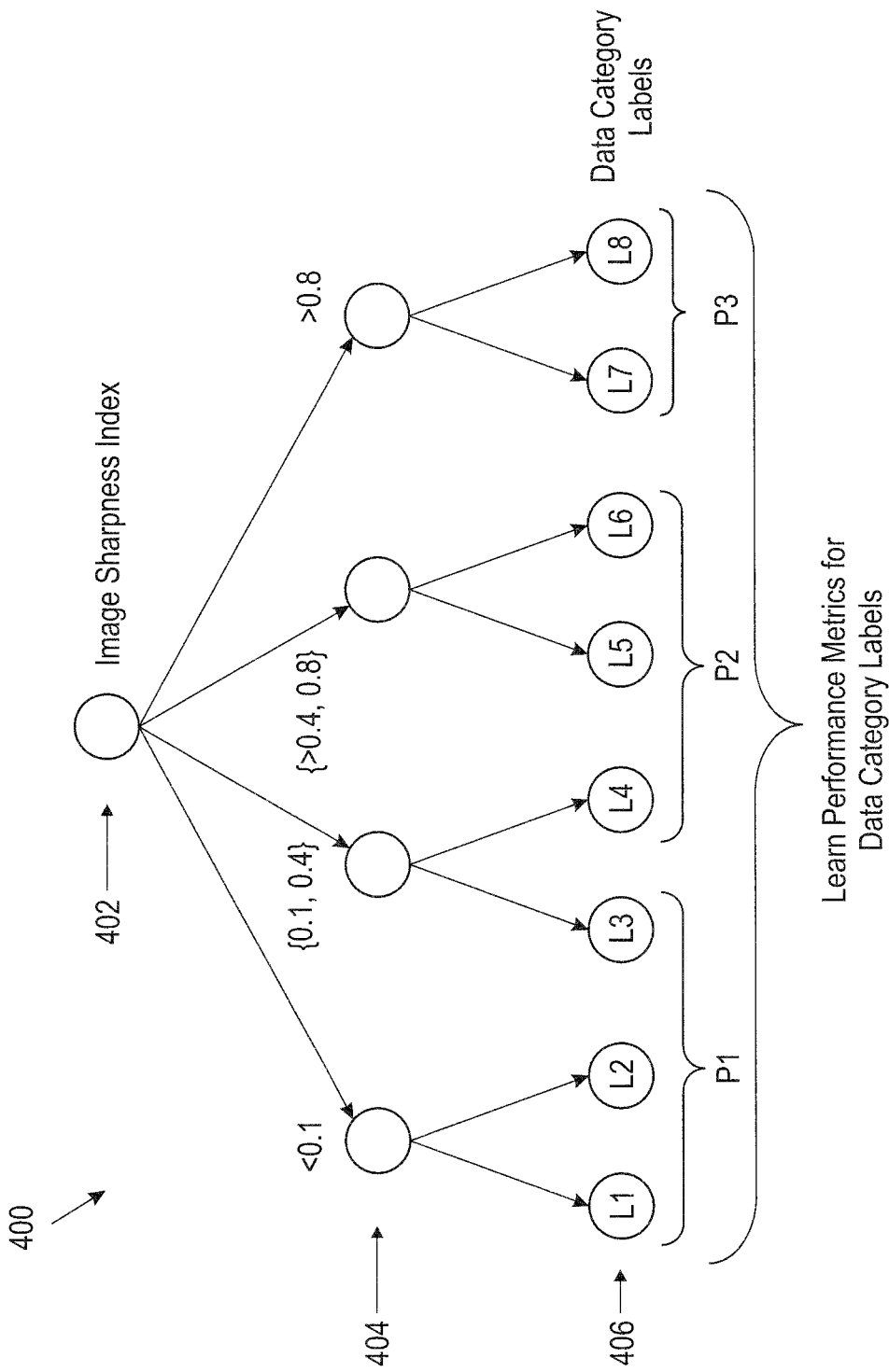
FIG. 4 illustrates a decision tree classification model which can be utilized to classify data categories of datasets, according to an embodiment of the invention.

FIG. 4 illustrates a decision tree classification model which can be utilized to classify data categories of datasets, according to an embodiment of the invention. In general, FIG. 4 illustrates a classification model 400 which comprises a hierarchical structure including nodes and directed edges. The nodes comprise a root node 402, internal nodes 404, and leaf nodes 406 (e.g., L1, L2, L3, L4, L5, L6, L7, and L8). The root node 402 has no incoming edges, but has outgoing edges to the internal nodes 404. Each internal node 404 has one incoming edge, and two outgoing edges to a given one of the leaf nodes 406. Each leaf node 406 comprises on incoming edge and no outgoing edge. In the decision tree model 402, each leaf node 406 is assigned a class label (data category). The root node 402 and the internal nodes 404 comprises attribute test conditions to classify a given dataset based on attributes of the dataset.

For example, the root node 402 shown in FIG. 4 uses a sharpness/blurriness attribute (or image sharpness index) as an initial test condition. In the exemplary embodiment, the image sharpness index comprises a continuous attribute, wherein the test condition is expressed as a range of outcomes, e.g., <0.1, {0.1, 0.4}, {>0.4, 0.8} and >0.8, which is used to differentiate datasets with different image sharpness metrics. Further, the internal nodes 404 may represent another image attribute, e.g. illumination metric, or image clutter metric, etc., wherein the test condition for the attribute associated with the internal nodes 404 comprises two potential outcomes (i.e., binary attribute). For example, the test condition for each internal node 404 may be a comparison of the metric value M with a threshold T, wherein the outcome is a binary outcome (M<T) or (M≥T).

The classification model 400 of FIG. 4 provides an example of an attribute classification model which can be learned and maintained in the dataset attribute classification models 216 and utilized by the classification engine 214 (FIG. 2) to label the data category of a given sampled dataset based on attributes of the sample dataset. For example, assume that a given dataset comprises a collection of images. The classification engine 214 can analyze the image dataset to determine an average/mean/median value of an associated probability distribution for each attribute (e.g., blurriness index, illumination index, clutter index, etc.) over the collection of images. The given dataset can then be classified using the decision tree model 400 shown in FIG. 4, wherein starting from the root node 402, a test condition for an image sharpness index for the given dataset (e.g., mean value of sharpness index of collection of images) is applied, wherein the outcome leads to another internal node 404 to which another test condition for another attribute (e.g., illumination index, clutter index, etc.) is applied, resulting in an outcome that leads to a given leaf node 406. The class label (e.g., data category) associated with the given leaf node 406 is then assigned to the given dataset. Each leaf node 406 in the decision tree 400 can be labeled with a class or a probability distribution over the classes.

In the example embodiment of FIG. 4, the class label that is assigned to the given data set comprises a data category that collectively represents at least two attributes associated with the dataset. It is to be understood that the decision tree 400 is merely an illustrative embodiment, and that a decision tree model may be constructed based on one attribute, or a combination of three or more different attributes, as desired for the given application.

As noted above, the performance learning engine 222 (FIG. 2) is configured to learn performance metrics for the data category labels associated with the data attribute classification models 216, wherein the performance metrics are utilized to generate the performance classification models 224. For example, as schematically illustrated in FIG. 4, by classifying the data attributes of historical datasets and determining the actual performance of such historical datasets as applied to a given machine learning API service model, the performance learning engine 222 may determine that different sets of data category labels (root nodes 406) provide different performances P1, P2, and P3 in terms of classification accuracies.

More specifically, in the example embodiment of FIG. 4, the performance learning engine 222 may determine that (i) datasets which are classified with data category labels for leaf nodes L1, L2 and L3 typically provide a first level of performance P1, (ii) datasets which are classified with data category labels for leaf nodes L4, L5 and L6 typically provide a second level of performance P2, and that (iii) datasets which are classified with data category labels for leaf nodes L7 and L8 typically provide a third level of performance P3. The performance learning engine 222 can utilize this information to build and maintain the performance classification models 224, which allow the service provider to determine an expected level of performance of a given machine learning API service applied to the sampled dataset (or current dataset) of a prospective customer (or registered customer) and, then dynamically determine a proper cost of the API service for the given customer as a function of the expected level of performance.

Figure 5:
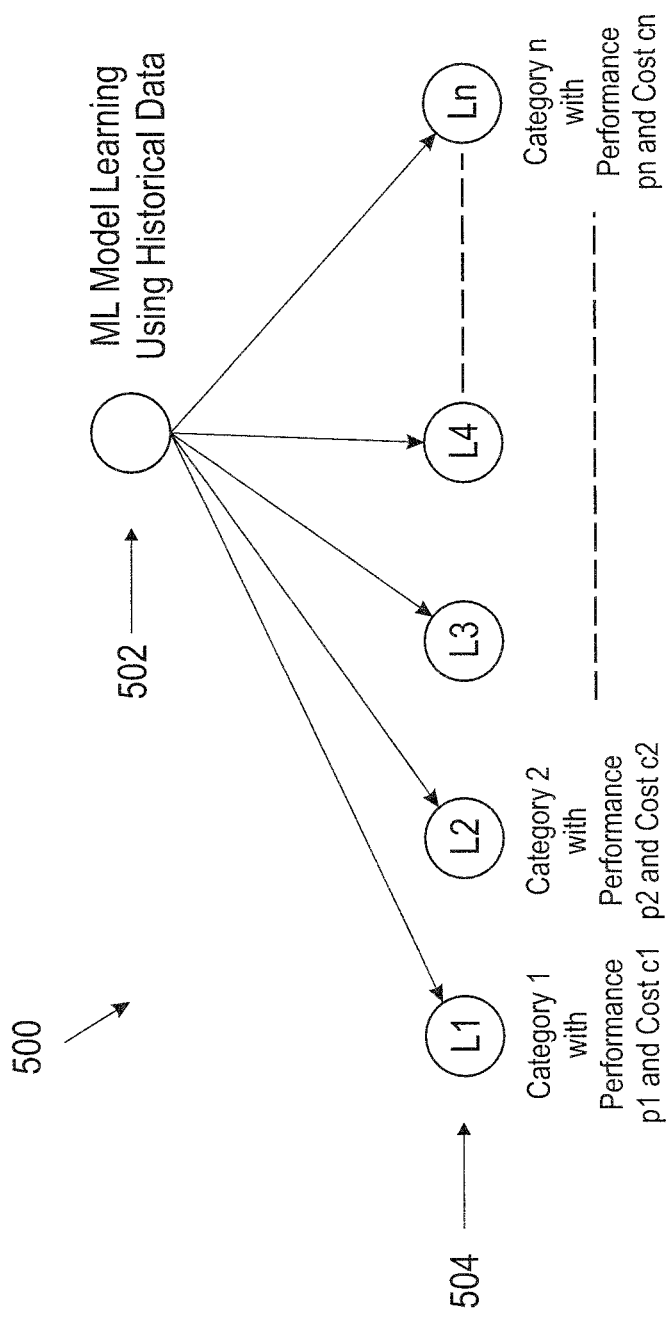
FIG. 5 illustrates a decision tree classification model which can be utilized to classify an expected level of performance of a given dataset based on a classified data category of the given dataset, according to an embodiment of the invention.

For example, FIG. 5 illustrates a decision tree classification model which can be utilized to classify an expected level of performance of a given dataset based on a classified data category of the given dataset, according to an embodiment of the invention. FIG. 5 shows an example embodiment of a decision tree classification model 500 which is utilized to determine a category label (e.g., Category 1, Category 2, . . . , Category n) for a given dataset, wherein each "category" is associated with a given Performance (p) and Cost (c). In this regard, the decision tree classification module 500 is used to classify an expected level of performance of a given dataset based on the classified data category of the given dataset In the example embodiment, the decision tree comprises a root node 502 and a plurality (n) of leaf nodes 504 (L1, L2, L3, L4, . . . , Ln), wherein each leaf node 504 is associated with a different (learned) expected level of performance p1, p2, p3, p4, . . . , pn. As further shown in FIG. 5, each leaf node 504 is associated with a different cost c1, c2, c3, c4, . . . , cn, which the service provider would charge a given customer based on the expected level of performance p1, p2, p3, p4, . . . , pn of the machine leaning API service as applied to a classified dataset of the given customer.

In one embodiment, each leaf node 504 may represent a single category label (e.g., class label) of a corresponding leaf node in a dataset attribute classification model (e.g., decision tree model 400 of FIG. 4) and an expected performance level which is learned for the single category label. In another embodiment, a given leaf node 504 in the decision tree model 500 of FIG. 5 may collectively represent a set of two or more category labels of corresponding leaf nodes in a dataset attribute classification model and the expected (learned) performance associated with the set of two or more category labels. By way of example, the "Category 1" label of the leaf node L1 in FIG. 5 may collectively represent the class labels of the set of leaf nodes L1, L2 and L3 shown in FIG. 4 which have the same or similar expected performance level P1.

In one embodiment, the decision tree classification model 500 could be utilized as follows. In the example embodiment of FIG. 2, the classification engine 214 would classify a data category of a sampled dataset of a prospective customer and the classification results (e.g., "category label") would be input to the dynamic API service pricing module 134 to determine an appropriate price for the API service based on the classification results ("category label") of the sampled dataset. The dynamic pricing engine 226 would access the decision tree model 500 from the database of performance classification models 224, and apply the "category label" (as the test condition) to the root node 502, to determine the target leaf node 504 which represents the classification ("category label") of the customer's sampled dataset. The target leaf node 504 would provide an indication of the expected level of performance of the customer's sampled dataset (as learned from similarly classified historical datasets). The dynamic pricing engine 226 would then determine the appropriate pricing scheme of the machine learning API service to offer to the customer based on the expected level of performance that the customer may realize based on the classification results of the sampled dataset of the customer.

For example, in the example embodiment of FIG. 5, the classification results of the sampled dataset of the customer may indicate that the sampled dataset falls under the "category 1" label based on the analyzed attribute(s) of the sampled dataset. In this example, the dynamic API service pricing module 134 would determine that the customer would obtain a level of performance p1 when processing the customer's dataset using the machine learning API service, and that the customer should be charged a cost c1 for such expected level of performance p1.

Figure 6:
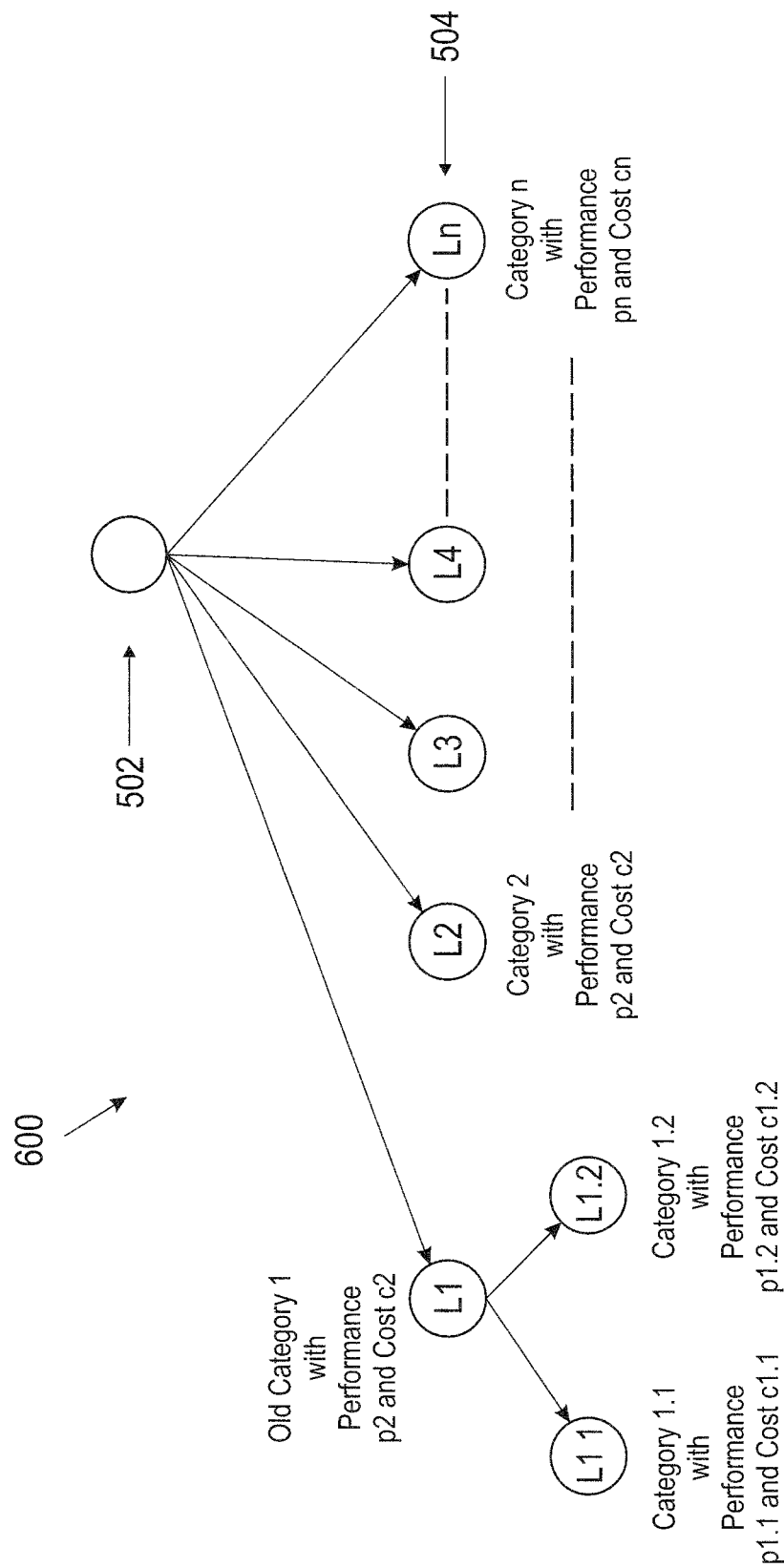
FIG. 6 schematically illustrates a method for modifying the decision tree classification model of FIG. 5 to divide a given leaf node for a given category/performance class (label) into subclasses, according to an embodiment of the invention.

FIG. 6 schematically illustrates a method for modifying the decision tree classification model 500 of FIG. 5 to divide a given leaf node for a given category/performance class (label) into subclasses, according to an embodiment of the invention. In one embodiment, FIG. 6 schematically illustrates a method for modifying the decision tree model 500 of FIG. 5 to generate a new decision tree model 600, when it is determined that the actual level of performance which a given customer receives for the machine learning API service does not correspond to the expected level of performance for which the customer is being charged.

For example, continuing with the above example, assume that a customer's dataset is initially classified as "category 1" with an expected level of performance p1 and cost c1. Based on feedback from the customer and a reevaluation of customer dataset using methods discussed below (FIGS. 7 and 8), the service provider may determine that the customer is indeed receiving a lower than expected level of performance using the machine learning API service. In this situation, as schematically illustrated in FIG. 6, the category of the original leaf node L1 may be divided into two sub categories, Category 1.1 and Category 1.2, wherein the original leaf node L1 becomes an internal node in the decision tree classification model 600, with outgoing edges to new leaf nodes L1.1 and L1.2, which are labeled with different performances p1.1 and p1.2, respectively, and assigned new costs c1.1 and c1.2. In this example, the new costs c1.1 and c1.2 are less than the original cost c1 and are commensurate with the newly determined expected performance levels p1.1 and p1.2.

Figure 7:
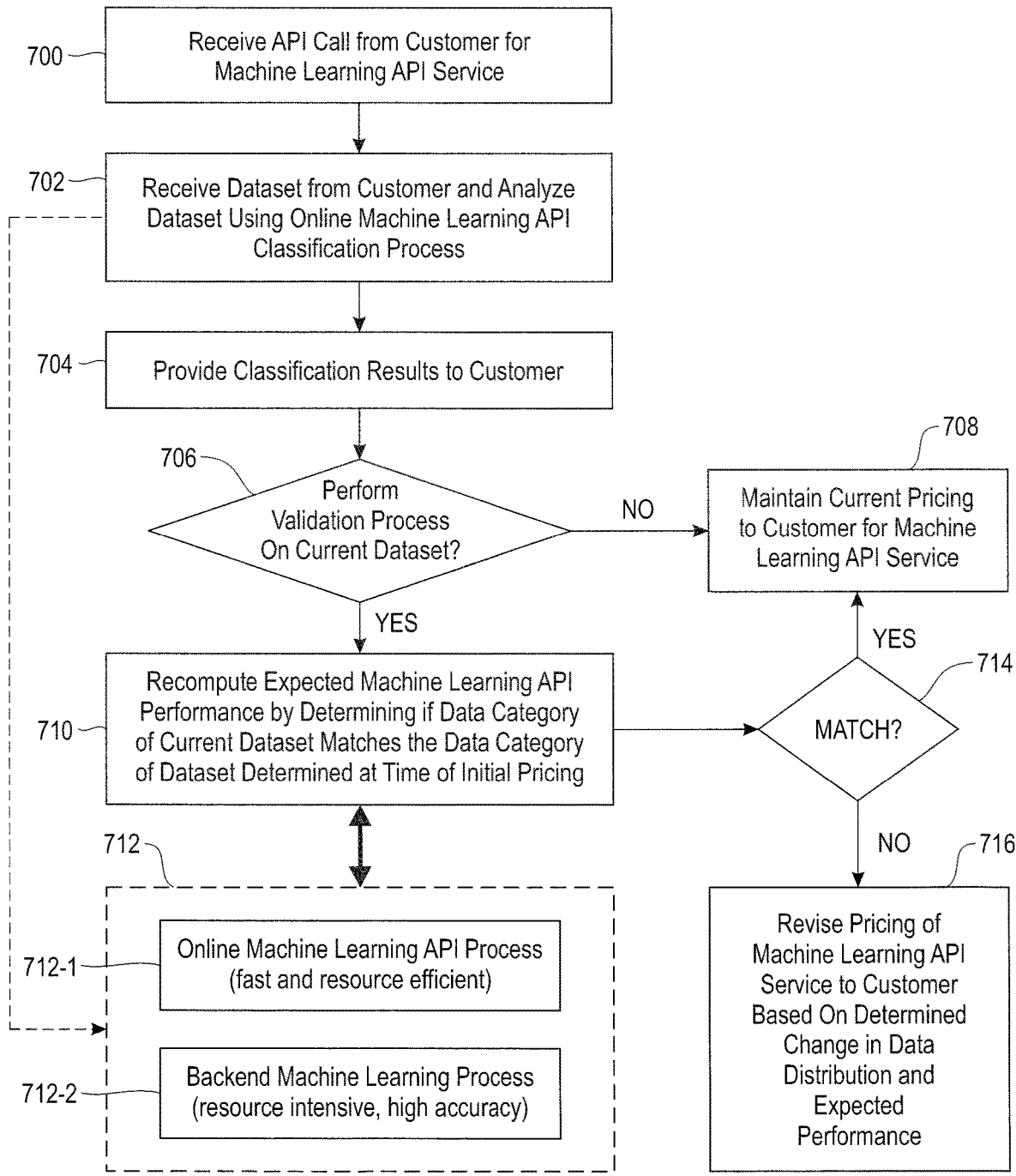
FIG. 7 is a flow diagram which illustrates methods for providing machine learning API services and dynamically updating price quotes for machine learning API services, according to embodiments of the invention.

FIG. 7 is a flow diagram which illustrates methods for providing machine learning API services and dynamically updating price quotes for machine learning API services, according to an embodiment of the invention. The process flow of FIG. 7 illustrates an exemplary method for periodically evaluating a current pricing for a machine learning API service to a given customer to ensure that the current price is consistent with the expected level of performance. Assume for example, that a given machine learning API model is trained to provide optimal performance based on a dataset that comprises a given probability distribution x for one or more attributes, as compared to other datasets which comprise other probability distributions. Assume further that during an initial pricing determination process, a given customer provided an initial sampled dataset which followed a data distribution y, which resulted in lower performance, thus decreasing the cost of utilizing the machine learning API service. If the customer then utilizes the machine learning API service with datasets that follow the optimal data distribution x, the customer will be obtaining a better level of performance for the machine learning API service, but at the lower initial pricing which was based on a lower expected level of performance. FIG. 7 illustrates a method to ensure that the customer is being appropriately charged for machine learning API services.

Based on the initial mutual agreement between the customer and the API service provider, the customer begins leveraging the machine learning API service and paying for such API service based on the initial agreed to price. The computing platform 130 will receive an API call from the customer for the machine learning API service (block 700) and then receive a dataset from the customer, which is analyzed using an online machine learning API classification process (block 702). The computing platform 130 will then return the classification results to the customer (block 704).

As illustrated in FIG. 7, in one embodiment of the invention, the machine learning API service module 132 of the computing platform 130 (FIG. 1) is configured to implement different machine learning classification processes 712 including an online machine learning API classification process 712-1, which is fast and resource efficient, and a backend machine learning classification process 712-2, which is resource intensive, but provides higher accuracy as compared to the online machine learning API classification process 712-1. The online machine learning API classification process 712-1 is utilized to process datasets that are provided in connection with machine learning API calls, wherein the backend machine learning classification process 712-2 is utilized for purposes of analyzing an initial sampled dataset and a current dataset of the customer to determine if the data distributions are similar and provide similar classification results.

When the computing platform 130 receives and processes a given dataset from the customer, a determination is made as to whether a validation process should be performed (block 706) to determine if the customer pricing for the API service should be modified. The validation process can be performed each time a new dataset is received from a given customer, after a predefined number of API service calls are received by the customer, etc. If a validation process is not performed on the current dataset received from the customer (negative determination in block 706), the current pricing for machine learning API services will be maintained for the given customer (block 708).

On the other hand, if the validation process is commenced (affirmative determination in block 706), the computing platform 130 will proceed to recompute an expected machine learning API performance by determining if one or more determined data categories of the current dataset match the one or more data categories of the initial sampled dataset determined at the initial pricing phase (block 710). If the data category/performance classification of the current dataset matches the data category/performance classification of the initial sampled dataset of the customer (affirmative result in block 714), then the current pricing to the customer is maintained (block 708). On the other hand, if the data category/performance classification of the current dataset does not match the data category/performance classification of the initial sampled dataset of the customer (negative result in block 714), then the current pricing to the customer can be revised based on a determined change in the data distribution and the expected level of performance (block 716). For example, if the data distribution of the current dataset is more closely matched to the data distribution used to train the machine learning API models, then customer would obtain increased classification performance and thus, should be charged a higher price for the machine learning API service. If there is a conflict, the mutual agreement process of FIG. 3 can be implemented to negotiate a new price to the customer for machine learning API services.

Figure 8:
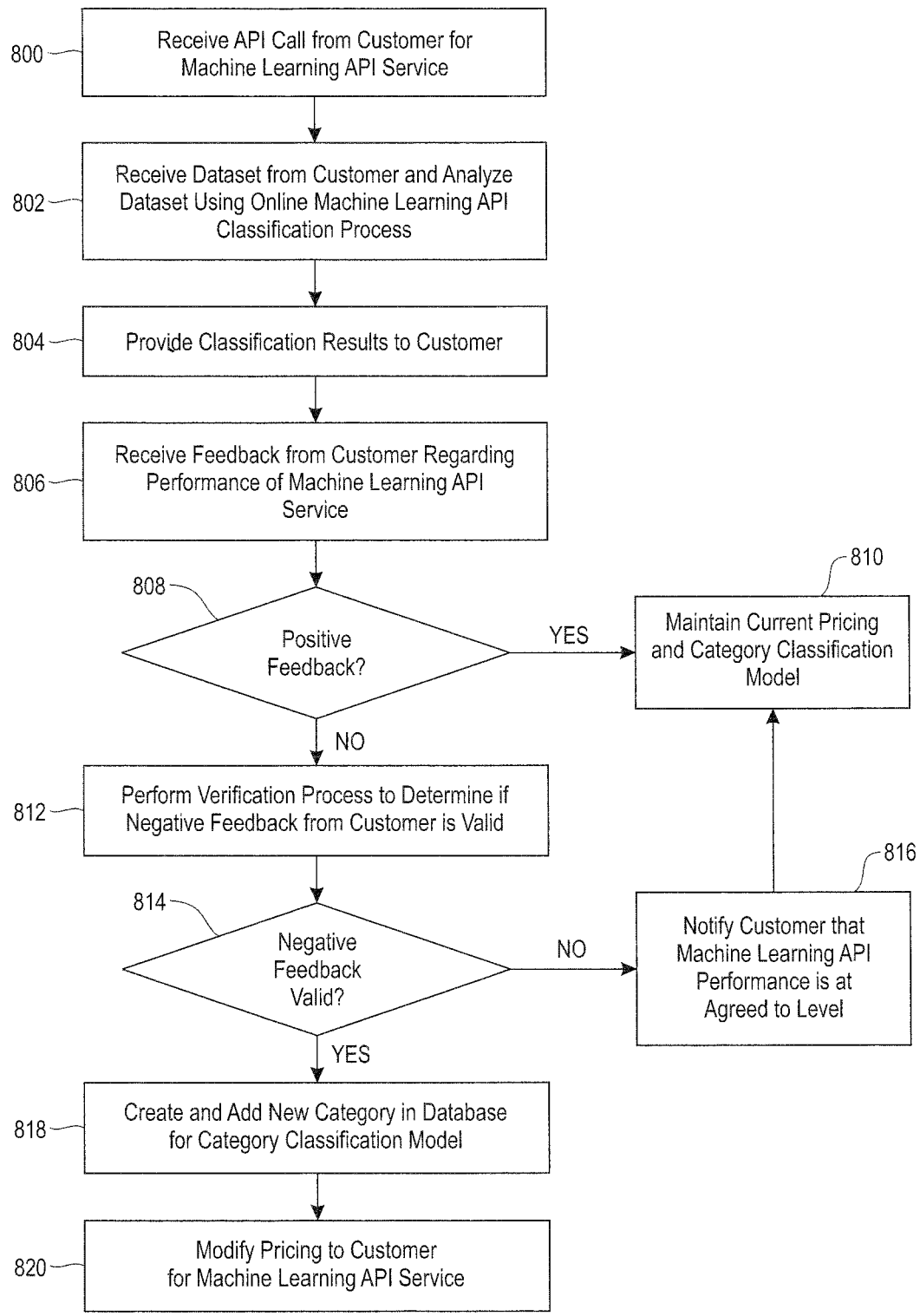
FIG. 8 is a flow diagram of a method for updating classification models based on customer feedback regarding actual performance of machine learning API services, according to an embodiment of the invention.

FIG. 8 is a flow diagram of a method for updating classification models based on customer feedback regarding actual performance of machine learning API services, according to an embodiment of the invention. Based on the initial mutual agreement between the customer and the API service provider, the customer begins leveraging the machine learning API service and paying for such API service based on the initial agreed to price. The computing platform 130 will receive an API call from the customer for the machine learning API service (block 800) and then receive a dataset from the customer, which is analyzed using an online machine learning API classification process (block 802). The computing platform 130 will then return the classification results to the customer (block 804).

The computing platform 130 can receive feedback from the customer regarding the customer's perceived performance of the machine learning API services based on the returned classification results (block 806). If the feedback is positive (affirmative result in block 808), it is determined that the customer is satisfied with the classification results. As such, the current pricing for the machine learning API service is maintained for the customer, and the classification models are not modified (block 810). On the other hand, if the feedback is not positive (negative result in block 808), the service provider will perform a verification process to determine if the negative feedback from the customer is valid or not (block 812). If the service provider determines that the negative feedback is not valid (negative determination in block 814), then the service provider will notify the customer that the classification results meet the expected performance level at the agreed-to pricing level (block 816). If the service provider determines that the negative feedback is valid (affirmative determination in block 814), the service provider may initiate a process to create and add one or more new data categories for updating the classification models in the database (block 818), and then proceed to modify the pricing to the customer based on the expected level of performance of the machine learning API service for the customer dataset based on the updated classification models (block 820).

While the above example embodiments are discussed in the context of applying machine learning API services to image datasets and dynamically pricing such services based on expected levels of performance as determined, in part, based on associated image attributes (illumination, blurriness, etc.), it is to be appreciated that the systems and methods discussed herein can be implemented for other types of datasets, including, but not limited to text data sets, multi-variate datasets, etc. For example, for text datasets, assume we have text data set for a financial domain. The attributes for a text dataset can be classified as simple, complex, short sentences. Other attributes can be numerical, categorical data etc. For multi-variate data sets, any multi-variate dataset can be categorized based on extent of values that are missing: complete, almost complete, sparse, etc.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 9, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 9:
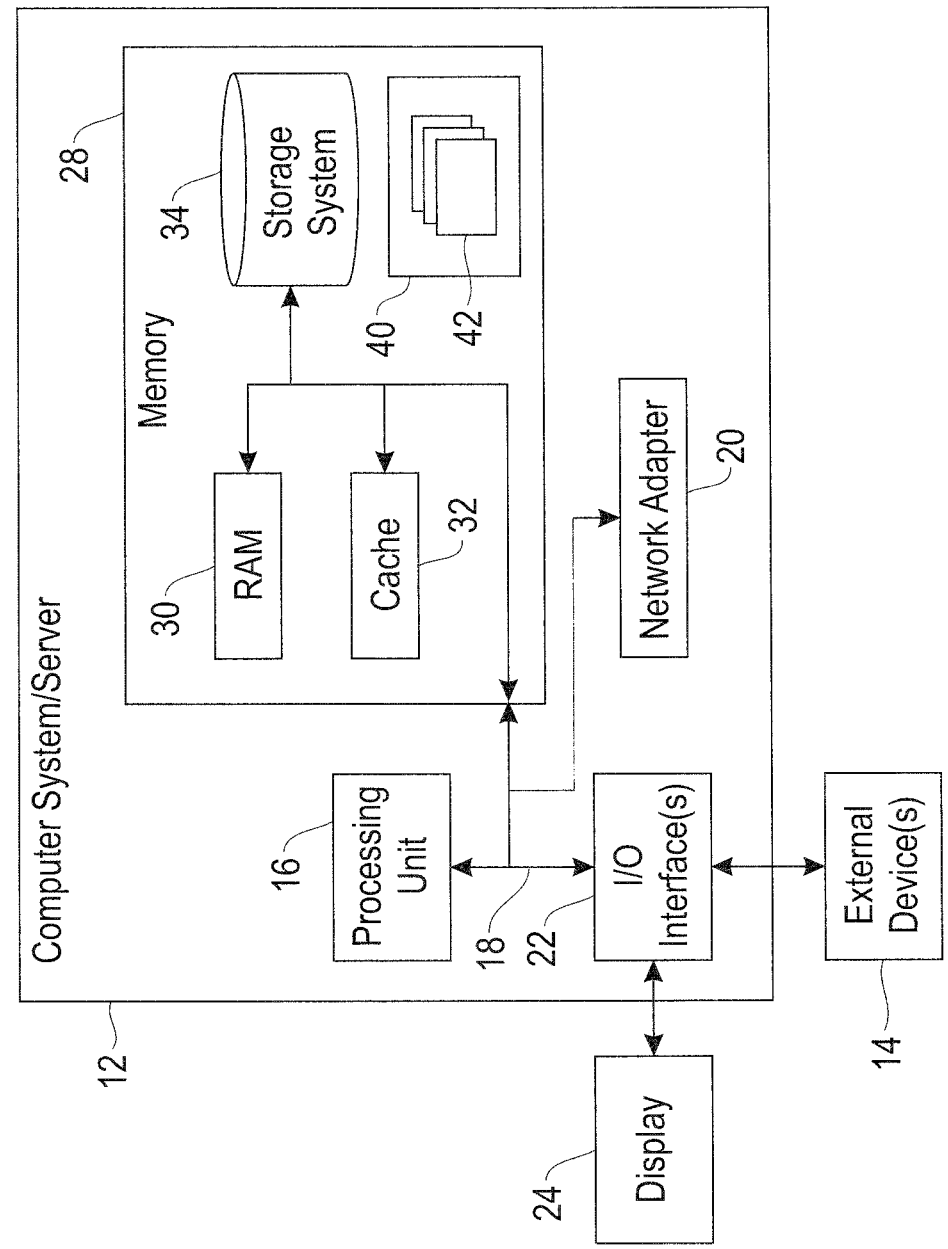
FIG. 9 is a system diagram of an exemplary computer system on which at least one embodiment of the invention can be implemented.

In FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
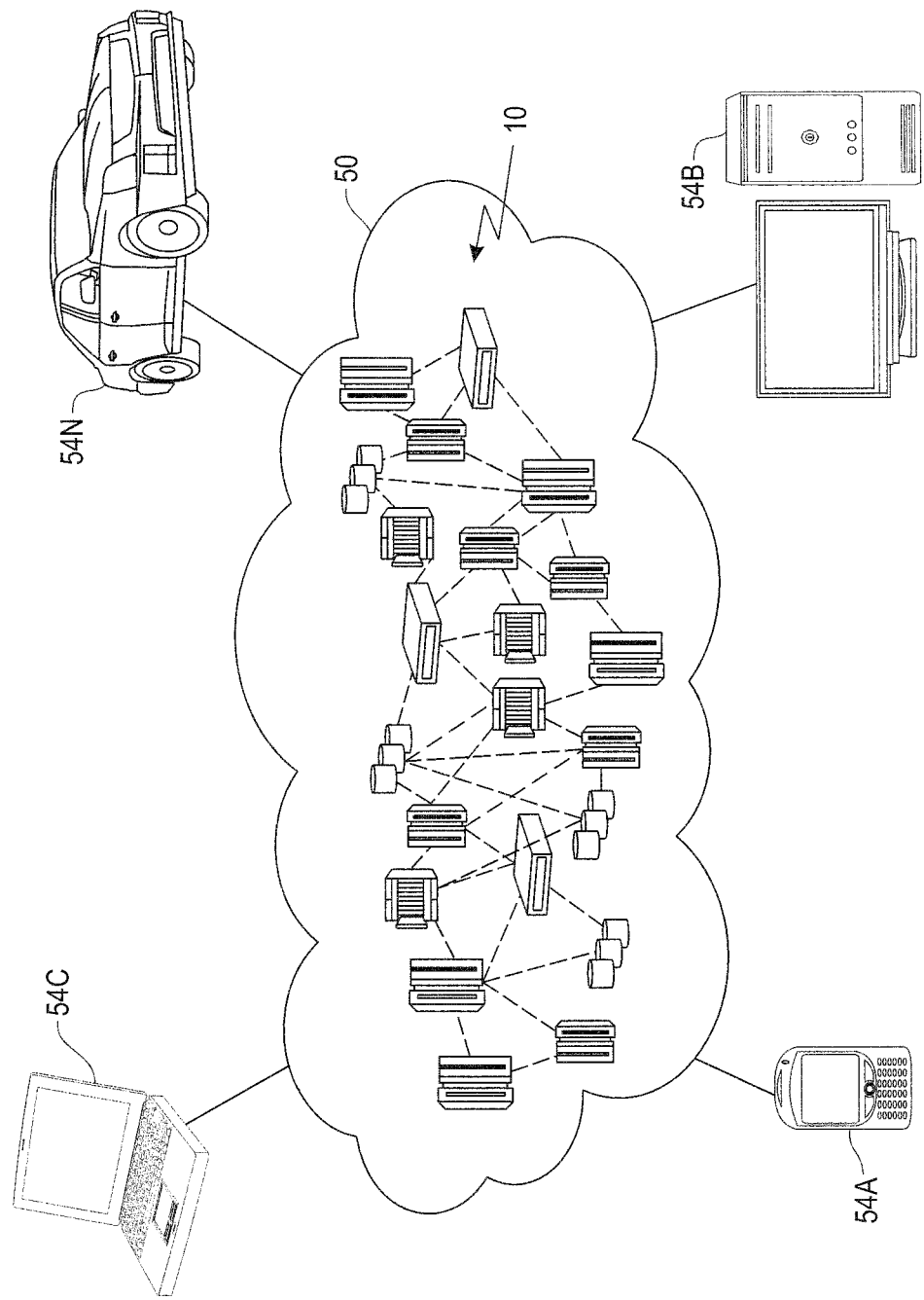
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
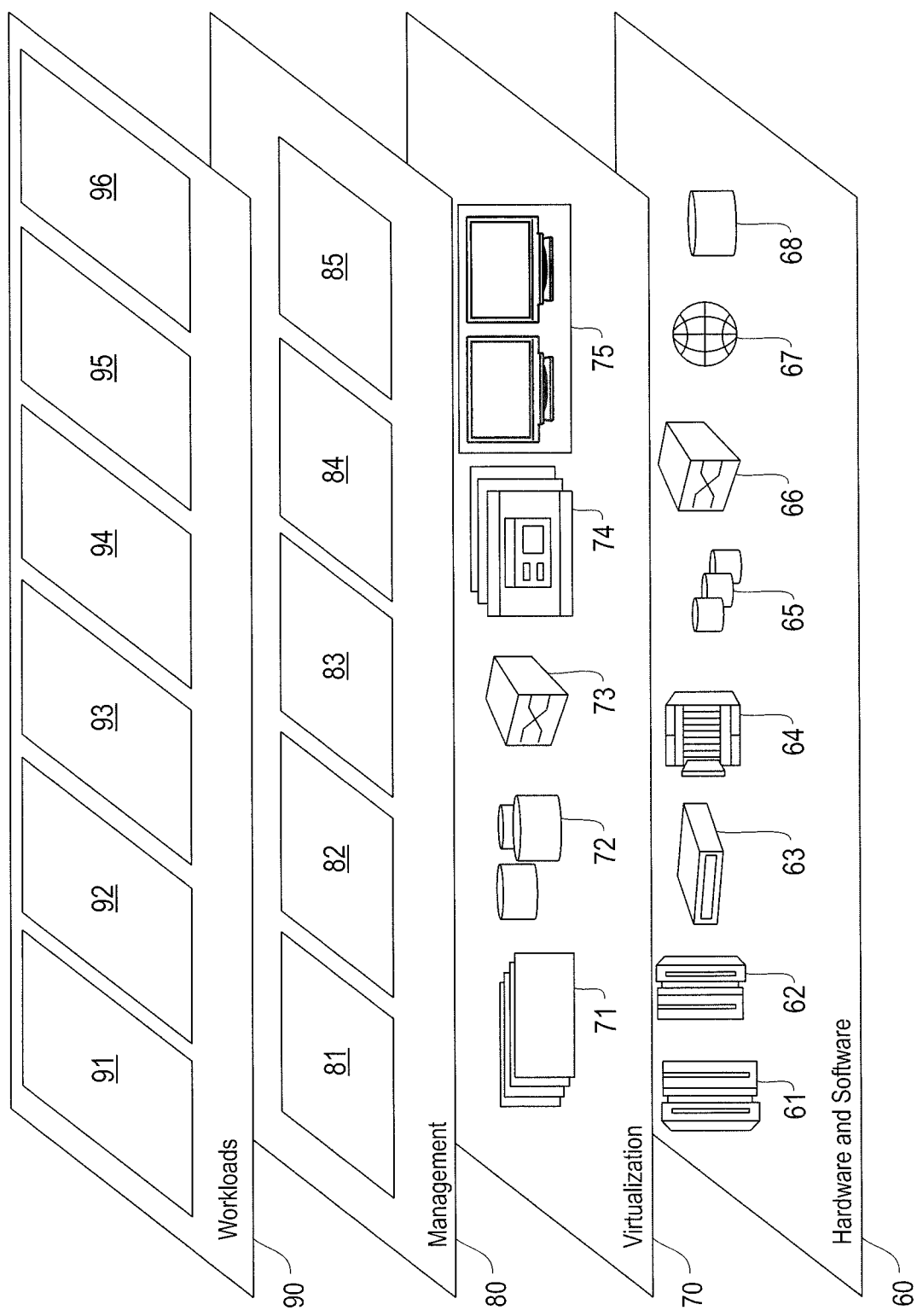
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions implemented by the API service providing computing platform 130 in FIG. 1, and in particular, the various functions of the system modules 131, 132, 133, and 134 of the computing platform 130, as discussed above with reference to FIGS. 1-8 to provide API services and dynamic pricing of API services to customers.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A method comprising:
  receiving a request for a machine learning application programming interface (API) service from a client computing device;

obtaining a dataset from the client computing device;
classifying one or more attributes of the dataset and classifying an expected level of performance of the machine learning API service applied to the dataset based on the one or more classified attributes of the dataset, wherein said classifying comprises:
training machine learning models comprising one or more attribute classification models and one or more performance classification models by processing historical attribute-related datasets derived from multiple users;
extracting features from the dataset;
utilizing the one or more attribute classification models to determine one or more attributes of the dataset based on the extracted features; and
utilizing the one or more performance classification models to determine the expected level of performance of the machine learning API service applied to the dataset based on the determined one or more attributes of the dataset;
wherein the one or more attribute classification models and the one or more performance classification models comprise decision tree classification models, each decision tree classification model comprising a root node, multiple internal nodes, and multiple leaf nodes, wherein the root node comprises one or more outgoing directed edges to one or more of the internal nodes, wherein each internal node has one incoming directed edge and one or more outgoing directed edges to a given one of the leaf nodes, wherein each leaf node comprises one incoming directed edge and each leaf node is assigned a class label associated with a given data category, and wherein the root node and the multiple internal nodes comprise attribute test conditions to classify the dataset based on the determined one or more attributes of the dataset;
dynamically determining a pricing for the machine learning API service based on the classified expected level of performance of the dataset; and
presenting the determined pricing for the machine learning API service on the client computing device;
wherein the method is performed by at least one processing device comprising a processor coupled to a memory.

2. The method of claim 1, wherein the one or more attributes of the dataset correspond to characteristics of the dataset that would affect classification performance of the dataset using the machine learning API service.

3. The method of claim 1, wherein the dataset comprises a set of images, and wherein the attributes comprise characteristics of the images that would affect classification performance of the images using the machine learning API service, wherein the attributes comprise one or more of a blurriness attribute, an illumination attribute, and a clutter attribute.

4. The method of claim 1, wherein said obtaining the dataset from the client computing device comprises sampling an entire dataset to generate a sampled dataset which comprises a subset of the entire dataset, wherein a data distribution of the sampled dataset corresponds to a data distribution of the entire dataset.

5. The method of claim 1, wherein the dataset comprises an initial dataset that is obtained as part of an initial customer registration process.

6. The method of claim 5, comprising periodically evaluating a current pricing to a given customer using an automated process, which comprises:
classifying one or more attributes of a current dataset and classifying an expected level of performance of the machine learning API service applied to the current dataset based on the one or more classified attributes of the current dataset; and
comparing the expected level of performance of the machine learning API service for the initial dataset against the expected level of performance of the machine learning API service for the current dataset; and
dynamically determining a new pricing for the machine learning API service, based on a comparison of results which indicate a difference between the expected performance levels of the initial and current datasets.

7. An article of manufacture comprising a computer readable storage medium having program instructions embodied therewith, wherein the program instructions are executable by a computer to perform a method comprising:
receiving a request for a machine learning application programming interface (API) service from a client computing device;
obtaining a dataset from the client computing device;
classifying one or more attributes of the dataset and classifying an expected level of performance of the machine learning API service applied to the dataset based on the one or more classified attributes of the dataset, wherein said classifying comprises:
training machine learning models comprising one or more attribute classification models and one or more performance classification models by processing historical attribute-related datasets derived from multiple users;
extracting features from the dataset;
utilizing the one or more attribute classification models to determine one or more attributes of the dataset based on the extracted features; and
utilizing the one or more performance classification models to determine the expected level of performance of the machine learning API service applied to the dataset based on the determined one or more attributes of the dataset;
wherein the one or more attribute classification models and the one or more performance classification models comprise decision tree classification models, each decision tree classification model comprising a root node, multiple internal nodes, and multiple leaf nodes, wherein the root node comprises one or more outgoing directed edges to one or more of the internal nodes, wherein each internal node has one incoming directed edge and one or more outgoing directed edges to a given one of the leaf nodes, wherein each leaf node comprises one incoming directed edge and each leaf node is assigned a class label associated with a given data category, and wherein the root node and the multiple internal nodes comprise attribute test conditions to classify the dataset based on the determined one or more attributes of the dataset;
dynamically determining a pricing for the machine learning API service based on the classified expected level of performance of the dataset; and
presenting the determined pricing for the machine learning API service on the client computing device.

8. The article of manufacture of claim 7, wherein the one or more attributes of the dataset correspond to characteristics of the dataset that would affect classification performance of the dataset using the machine learning API service.

9. The article of manufacture of claim 7, wherein the dataset comprises a set of images, and wherein the attributes comprise characteristics of the images that would affect classification performance of the images using the machine learning API service, wherein the attributes comprise one or more of a blurriness attribute, an illumination attribute, and a clutter attribute.

10. The article of manufacture of claim 7, wherein said obtaining the dataset from the client computing device comprises sampling an entire dataset to generate a sampled dataset which comprise a subset of the entire dataset, wherein a data distribution of the sampled dataset corresponds to a data distribution of the entire dataset.

11. The article of manufacture of claim 7, wherein the dataset comprises an initial dataset that is obtained as part of an initial customer registration process.

12. The article of manufacture of claim 11, comprising periodically evaluating a current pricing to a given customer using an automated process, which comprises:
classifying one or more attributes of a current dataset and classifying an expected level of performance of the machine learning API service applied to the current dataset based on the one or more classified attributes of the current dataset; and
comparing the expected level of performance of the machine learning API service for the initial dataset against the expected level of performance of the machine learning API service for the current dataset; and
dynamically determining a new pricing for the machine learning API service, based on comparison results which indicate a difference between the expected performance levels of the initial and current datasets.

13. A system, comprising:
a computing platform of an application programming interface (API) service provider comprising computing modules executing on one or more computing nodes of a network, wherein the computing platform is configured to:
receive a request for a machine learning API service from a client computing device;
obtain a dataset from the client computing device;
classify one or more attributes of the dataset and classify an expected level of performance of the machine learning API service applied to the dataset based on the one or more classified attributes of the dataset, wherein said classifying comprises:
training machine learning models comprising one or more attribute classification models and one or more performance classification models by processing historical attribute-related datasets derived from multiple users;
extracting features from the dataset;
utilizing the one or more attribute classification models to determine one or more attributes of the dataset based on the extracted features; and
utilizing the one or more performance classification models to determine the expected level of performance of the machine learning API service applied to the dataset based on the determined one or more attributes of the dataset;
wherein the one or more attribute classification models and the one or more performance classification models comprise decision tree classification models, each decision tree classification model comprising a root node, multiple internal nodes, and multiple leaf nodes, wherein the root node comprises one or more outgoing directed edges to one or more of the internal nodes, wherein each internal node has one incoming directed edge and one or more outgoing directed edges to a given one of the leaf nodes, wherein each leaf node comprises one incoming directed edge and each leaf node is assigned a class label associated with a given data category, and wherein the root node and the multiple internal nodes comprise attribute test conditions to classify the dataset based on the determined one or more attributes of the dataset;
dynamically determine a pricing for the machine learning API service based on the classified expected level of performance of the dataset; and
present the determined pricing for the machine learning API service on the client computing device.

14. A method comprising:
receiving by a server, a request for a machine learning application programming interface (API) service from a client computing device;
accessing by the server, a sampled dataset on the client computing device;
facilitating classification of one or more attributes of the sampled dataset on the client computing device and classification of an expected level of performance of the machine learning API service applied to the sampled dataset based on the one or more classified attributes of the sampled dataset, wherein said facilitating the classifications comprises:
training machine learning models comprising one or more attribute classification models and one or more performance classification models by processing historical attribute-related datasets derived from multiple users;
extracting features from the dataset;
utilizing the one or more attribute classification models to determine one or more attributes of the dataset based on the extracted features; and
utilizing the one or more performance classification models to determine the expected level of performance of the machine learning API service applied to the dataset based on the determined one or more attributes of the dataset;
wherein the one or more attribute classification models and the one or more performance classification models comprise decision tree classification models, each decision tree classification model comprising a root node, multiple internal nodes, and multiple leaf nodes, wherein the root node comprises one or more outgoing directed edges to one or more of the internal nodes, wherein each internal node has one incoming directed edge and one or more outgoing directed edges to a given one of the leaf nodes, wherein each leaf node comprises one incoming directed edge and each leaf node is assigned a class label associated with a given data category, and wherein the root node and the multiple internal nodes comprise attribute test conditions to classify the dataset based on the determined one or more attributes of the dataset;
receiving by the server, classification results returned from the client computing device, wherein the classification results comprise the classified expected level of performance of the sampled dataset;

dynamically determining by the sever, a pricing for the machine learning API service based on the returned classification results; and presenting by the server, the determined pricing for the machine learning API service on the client computing device;

wherein the method is performed by at least one processing device comprising a processor coupled to a memory.

* * * * *